United States Patent [19]
La Gois et al.

[11] Patent Number: 5,529,453
[45] Date of Patent: Jun. 25, 1996

[54] REAR BUMPER MOUNTED VAN AND TRUCK WINCHES

[76] Inventors: Christopher C. La Gois, 65 Clay Pit Rd.; Peter Stears, 43 Widgeon La., both of Sag Harbor, N.Y. 11963

[21] Appl. No.: 293,043

[22] Filed: Aug. 19, 1994

[51] Int. Cl.⁶ .................................................. B60P 9/00
[52] U.S. Cl. ........................ 414/462; 414/540; 254/280
[58] Field of Search ........................... 414/462, 539, 414/540; 212/180; 254/280, 281, 325, 326; 294/81.56

[56] References Cited

U.S. PATENT DOCUMENTS

| | | | |
|---|---|---|---|
| 521,774 | 6/1894 | Perl | 294/81.56 |
| 1,147,495 | 7/1915 | Fisher | 254/325 |
| 3,048,291 | 8/1962 | Mabry | 414/462 |
| 3,139,203 | 6/1964 | Borger | 414/462 |
| 3,819,074 | 6/1974 | Oliver | 414/462 |
| 4,216,941 | 8/1980 | Little | 254/326 |
| 4,325,666 | 4/1982 | Chain et al. | 414/540 |
| 4,439,086 | 3/1984 | Thede | 414/462 |
| 5,064,078 | 11/1991 | Van Staveren | 212/180 |

Primary Examiner—Michael S. Huppert
Assistant Examiner—Douglas A. Hess

[57] ABSTRACT

A rear bumper mounted van and truck winch comprising a frame having two long vertical segments and one short horizontal segment, the segments including a plurality of apertures, the horizontal segment being affixed to the upper ends of the vertical segments, the horizontal segment including a generally cylindrical shaped pulley wheel affixed thereto, the lowermost extent of each vertical segment including a bracket to permit coupling to the rear bumper of a vehicle, a strap being coupled to the horizontal segment and the rear of the vehicle to enhance the strength of the frame; and a winch base having two horizontal components and a vertical component therebetween, each of the components including a plurality of apertures, the horizontal components of the base being affixed to the frame with a portion thereof extending beyond one of the vertical segments, a hand winch formed in a generally cylindrical configuration with a handle projecting therefrom being affixed to the base, the hand winch including cable positioned therearound and through the pulley wheel on the frame, the lowermost extent of the cable including a coupling device affixed thereto to permit lifting of heavy objects.

5 Claims, 3 Drawing Sheets

5,529,453

REAR BUMPER MOUNTED VAN AND TRUCK WINCHES

BACKGROUND OF THE INVENTION

1. Field of the Invention

The present invention relates to rear bumper mounted van and truck winches and more particularly pertains to lifting and transporting heavy items from the rear of a vehicle.

2. Description of the Prior Art

The use of truck hoists is known in the prior art. More specifically, truck hoists heretofore devised and utilized for the purpose of loading and unloading large items to and from truck beds are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,797,672 to Vermette discloses an apparatus attachable to a truck body or the like for use for hoisting or lifting, or as an elevated support.

U.S. Pat. No. 4,111,316 to Wappler discloses a truck mounted hoist.

U.S. Pat. No. 4,872,581 to Wedhorn discloses a knockdown boom for pick-up truck.

U.S. Pat. No. 5,119,961 to Runn discloses an electric pickup winch.

In this respect, the rear bumper mounted van and truck winches according to the present invention substantially depart from the conventional concepts and designs of the prior art, and in doing so provide an apparatus primarily developed for the purpose of lifting and transporting heavy items from the rear of a vehicle.

Therefore, it can be appreciated that there exists a continuing need for new and improved rear bumper mounted van and truck winches which can be used for lifting and transporting heavy items from the rear of a vehicle. In this regard, the present invention substantially fulfills this need.

SUMMARY OF THE INVENTION

In view of the foregoing disadvantages inherent in the known types of truck hoists now present in the prior art, the present invention provides improved rear bumper mounted van and truck winches. As such, the general purpose of the present invention, which will be described subsequently in greater detail, is to provide new and improved rear bumper mounted van and truck winches and method which have all the advantages of the prior art and none of the disadvantages.

To attain this, the present invention essentially comprises a new and improved rear bumper mounted van and truck winch comprising a frame formed of three generally rectangular shaped blocks and configured in a rectangular orientation, the frame having a first and second long vertical segment and one short horizontal segment, the segments having a front face, a rear face, an upper region, a lower region and a central region therebetween, the upper, lower and central regions of the vertical segments including apertures extending therethrough, the lower region also including holes extending through its side faces, the horizontal segment including apertures extending therethrough near each end, the horizontal segment being affixed to the front face of the vertical segments with nuts and bolts through the aligned apertures, a strap being coupled to the horizontal segment and the rear of the vehicle to enhance the strength of the frame, the lowermost extent of each vertical segment including an affixed bracket to permit coupling to the rear bumper of a truck or van in the operative orientation, the brackets including releasably coupled disconnect pins to permit the user to quickly and easily remove the apparatus from the rear bumper of the vehicle when not in use; a winch base having upper and lower long horizontal components and a short vertical component connecting the two therebetween, all of the components having apertures extending through their respective ends, the upper horizontal components having a first end and a second end and also including three apertures extending through its midpoint and second end, the lower horizontal components having a first end and a second end and also including an aperture between its midpoint and second end, the horizontal components having their first ends affixed to the rear face of the uppermost and lowermost extents of the central region of a first vertical segment of the frame with nuts and bolts, the horizontal components of the base extending beyond a second vertical segment of the frame with the horizontal components being affixed thereto with nuts and bolts through the aligned apertures, the second end of each horizontal component being affixed to the ends of the vertical component with nuts and bolts through the aligned apertures, two angled side supports forming an inverted V-shaped structure being coupled to the upper horizontal component of the base and the second vertical segment of the frame; a hand winch and surrounding bracket, the bracket formed in a generally C-shaped configuration with its middle region affixed to the vertical component of the winch base, the bracket having a front portion and a rear portion, a handle shaped in a generally L-shaped configuration being affixed to the front portion and extending horizontally therethrough to the rear portion, the horizontally extending section of the handle being coupled to the hand winch, the hand winch being formed of two generally planar circular members with a centrally positioned axle connecting the two therebetween, the axle of the winch extending beyond the circular members and affixed between the front and rear portions of the bracket, a cable with two free ends having one end coupled to the axle to permit rotational winding of the cable thereupon, in the operative orientation the user turning the handle in a clockwise direction to lift affixed objects; an upper pulley formed of three generally semi-circular shaped elements, the central element having a longer length than the other two elements and including an aperture to permit affixation to the center point of the horizontal segment of the frame, the upper pulley having rotatable axles positioned between the first and second elements, and second and third elements, the upper pulley adapted to support the cable threaded around both axles for the purpose of affecting a three to one lifting ratio; a side pulley being affixed to the approximate center point of the upper region of the second vertical segment of the frame, the side pulley formed of two generally semi-circular shaped elements with a rotatable axle positioned therebetween; a lower pulley formed of two generally planar circular shaped elements with a centrally located rotatable axle positioned therebetween, the lower pulley having generally U-shaped members affixed to diametrically opposing sides of each planar circular element, one member being attached to a free end of the cable, the lower pulley adapted to support the cable threaded around its axle; and a hook system formed of a length of cable with two free ends, the middle portion of the cable being formed into a circular configuration with a clip closing off the circle, the circle being affixed around the lower U-shaped member of the lower pulley, the two free ends of the cable being affixed through a generally cylindrical shaped pipe, below the pipe being a ring affixed to each free end of the cable, each ring being affixed to a towing hook to permit coupling with a hand truck or other lifting device, the system including two straps adapted to be positioned around an object to be lifted when in the operative orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved rear bumper mounted van and truck winches which have all the advantages of the prior art truck hoists and none of the disadvantages.

It is another object of the present invention to provide new and improved rear bumper mounted van and truck winches which may be easily and efficiently manufactured and marketed.

It is further object of the present invention to provide new and improved rear bumper mounted van and truck winches which are of durable and reliable constructions.

An even further object of the present invention is to provide new and improved rear bumper mounted van and truck winches which are susceptible of a low cost of manufacture with regard to both materials and labor, and which accordingly are then susceptible of low prices of sale to the consuming public, thereby making such rear bumper mounted van and truck winches economically available to the buying public.

Still yet another object of the present invention is to provide new and improved rear bumper mounted van and truck winches which provide in the apparatuses and methods of the prior art some of the advantages thereof, while simultaneously overcoming some of the disadvantages normally associated therewith.

Even still another object of the present invention is to lift and transport heavy items from the rear of a vehicle.

Lastly, it is an object of the present invention to provide a new and improved rear bumper mounted van and truck winch comprising a frame having two long vertical segments and one short horizontal segment, the segments including a plurality of apertures, the horizontal segment being affixed to the upper ends of the vertical segments, the horizontal segment including a generally cylindrical shaped pulley wheel affixed thereto, the lowermost extent of each vertical segment including a bracket to permit coupling to the rear bumper of a vehicle, a strap being coupled to the horizontal segment and the rear of the vehicle to enhance the strength of the frame; and a winch base having two horizontal components and a vertical component therebetween, each of the components including a plurality of apertures, the horizontal components of the base being affixed to the frame with a portion of thereof extending beyond one of the vertical segments, a hand winch formed in a generally cylindrical configuration with a handle projecting therefrom being affixed to the base, the hand winch including cable positioned therearound and through the pulley wheel on the frame, the lowermost extent of the cable including a coupling device affixed thereto to permit lifting of heavy objects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
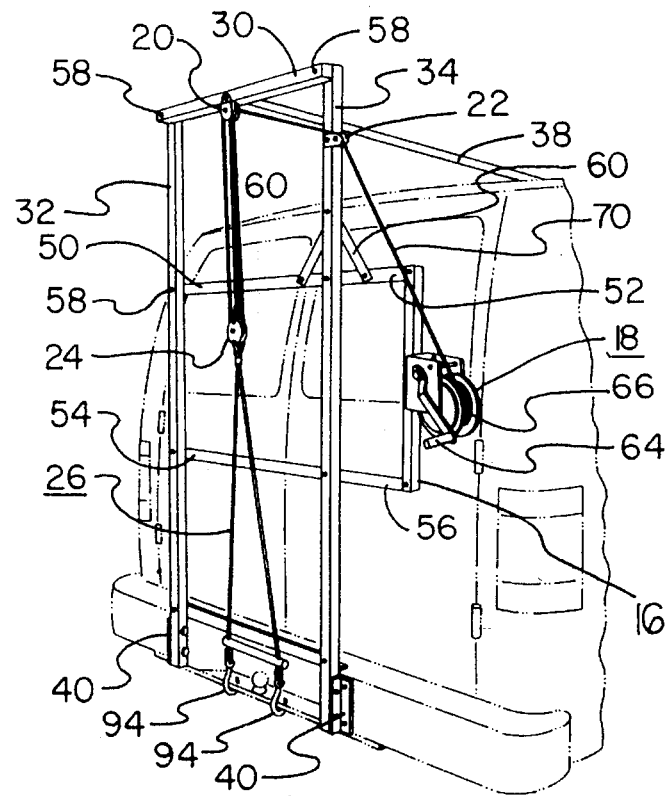
FIG. 1 is a perspective view of the preferred embodiment of the rear bumper mounted van and truck winch constructed in accordance with the principles of the present invention.

With reference now to the drawings, and in particular to FIG. 1 thereof, the preferred embodiment of the new and improved rear bumper mounted van and truck winch embodying the principles and concepts of the present invention and generally designated by the reference numeral 10 will be described.

The present invention, the new and improved rear bumper mounted van and truck winch is comprised of a plurality of components. Such components in their broadest context include a frame 12, a winch base 16, a hand winch 18, an upper pulley 20, a side pulley 22, a lower pulley 24 and a hook system 26. Such components are individually configured and correlated with respect to each otter so as to attain the desired objective.

Figure 2:
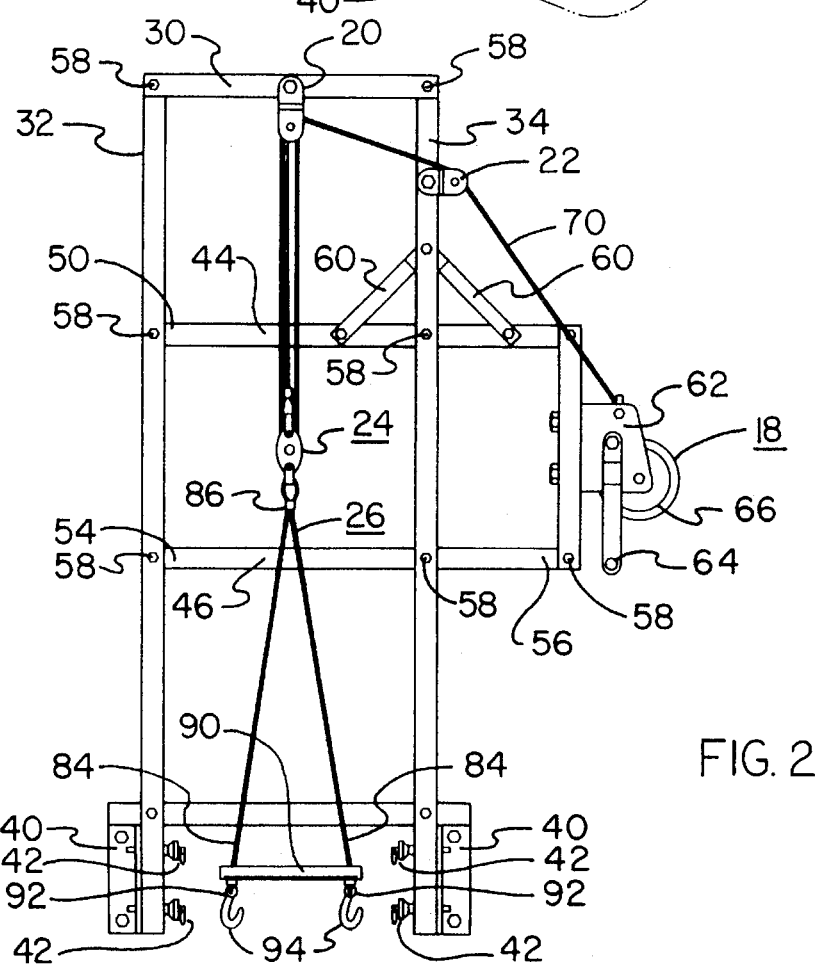
FIG. 2 is a rear perspective view of the apparatus disconnected from its corresponding vehicle.

More specifically, the frame 12 is formed of three generally rectangular shaped blocks 30, 32, 34 and configured in a rectangular orientation. The frame has a first 32 and second 34 long vertical segment and one short horizontal segment 30. The segments are fabricated of iron to insure strength and durability of the apparatus. The segments have a front face, a rear face, an upper region, a lower region and a central region therebetween. The upper, lower and central regions of the vertical segments include apertures extending therethrough, the lower region also including holes extending through their side faces. Note FIGS. 1 and 2.

The horizontal segment 30 includes apertures extending therethrough near each end. The horizontal segment is affixed to the front face of the vertical segments with nuts and bolts 58 through the aligned apertures. A strap 38 is coupled to the horizontal segment and the rear of the vehicle to enhance the strength of the frame. The strap is fabricated of sturdy materials and is adapted to prevent the apparatus from bending rearwardly in the operative orientation. The lowermost extent of each vertical segment includes an affixed bracket 40 to permit coupling to the rear bumper of a truck or van in the operative orientation. The brackets include releasably coupled disconnect pins 42 to permit the user to quickly and easily remove the apparatus from the rear bumper of the vehicle when not in use. The quick disconnect pins include rings to aid users in removal and replacement thereof. Note FIG. 2.

A winch base 16 has upper 44 and lower 46 long horizontal components and a short vertical component 48 connecting the two therebetween. The segments are fabricated of iron to insure strength and durability of the apparatus. All of the components have apertures extending through their respective ends. The upper horizontal component has a first end 50 and a second end 52 and also includes three apertures extending through its midpoint and second end. The lower horizontal component has a first end 54 and a second end 56, and also includes an aperture between its midpoint and second end. Note FIGS. 1 and 2.

Figure 3:
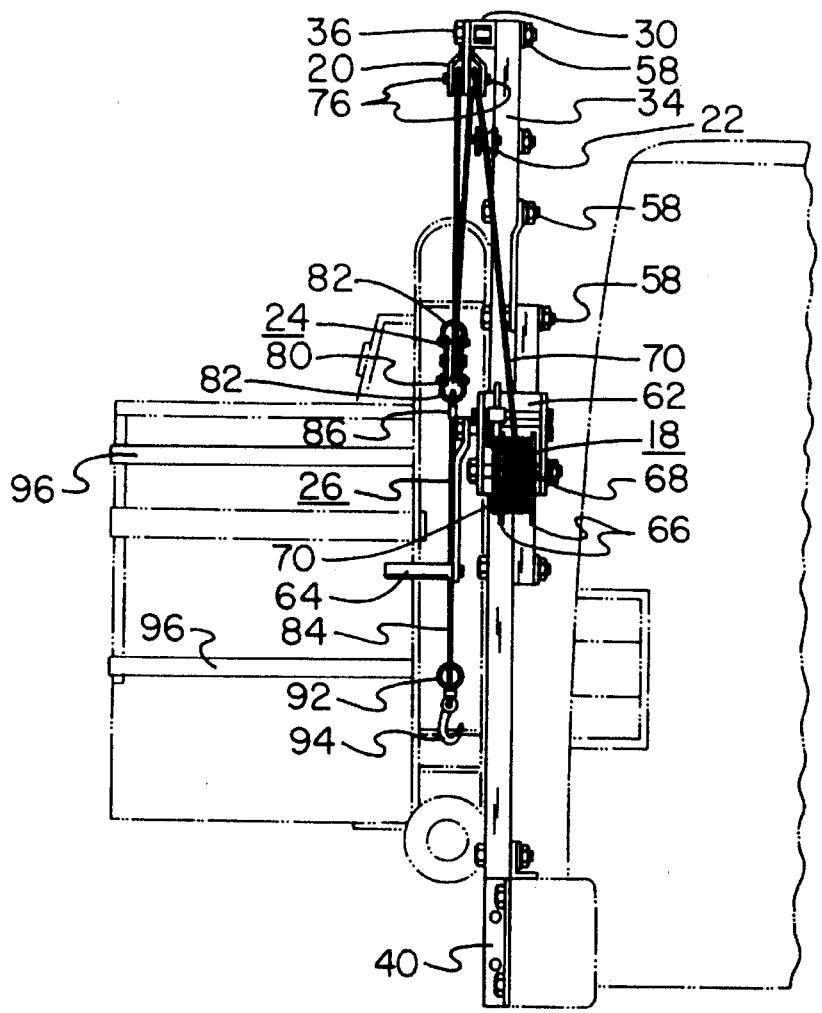
FIG. 3 is a side perspective view of the apparatus illustrating the hand winch component.
Figure 4:
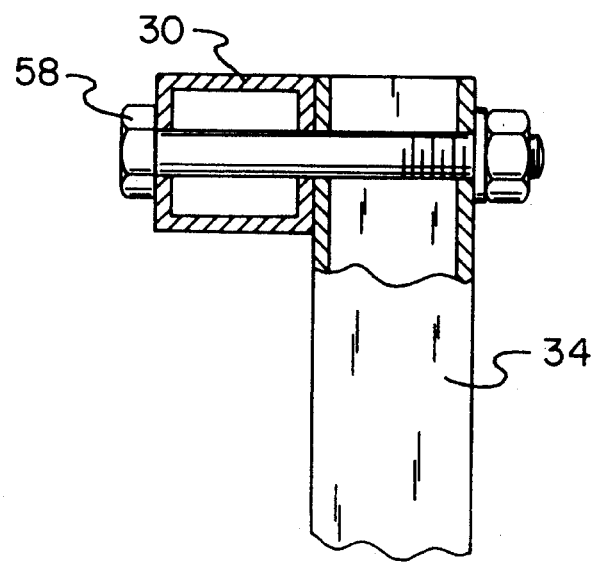
FIG. 4 is an exploded cross sectional view of a connection between the frame and winch base of the apparatus illustrating positioning of a cooperatively coupled bolt and nut therethrough.

The horizontal components have their first ends affixed to the rear face of the uppermost and lowermost extents of the central region of a first vertical segment of the frame with nuts and bolts 58. The nuts and bolts are fabricated of iron to insure a strong and stable connection. Note FIG. 4. The horizontal components of the base extend beyond the second vertical segment of the frame with the horizontal components being affixed thereto with nuts and bolts 58 through the aligned apertures. The second end of each horizontal component is affixed to the ends of the vertical component with nuts and bolts 58 through the aligned apertures. Two angled side supports 60 forming an inverted V-shaped structure are coupled to the upper horizontal component of the base and the second vertical segment of the frame. The angled side supports add strength and stability to the winch base. Note FIGS. 1, 2 and 3.

A hand winch 18 has a surrounding bracket 62. The bracket is formed in a generally C-shaped configuration with its middle region affixed to the vertical component of the winch base. The bracket has a front portion and a rear portion. A handle 64 shaped in a generally L-shaped configuration is affixed to the front portion and extends horizontally therethrough to the rear portion. The horizontally extending section of the handle is coupled to the hand winch. The handle permits the user to firmly grip and turn the hand winch in the operative orientation. Note FIGS. 1 and 3.

The hand winch is formed of two generally planar circular members 66 with a centrally positioned axle 68 connecting the two therebetween. The axle of the winch extends beyond the circular members and is affixed between the front and rear portions of the bracket. A cable 70 with two free ends has one end coupled to the axle to permit rotational winding of the cable thereupon. In the operative orientation the user turns the handle in a clockwise direction to lift affixed objects. The cable is fabricated of sturdy materials to permit lifting and transport of heavy objects. Note FIGS. 1 and 3.

Figure 6:
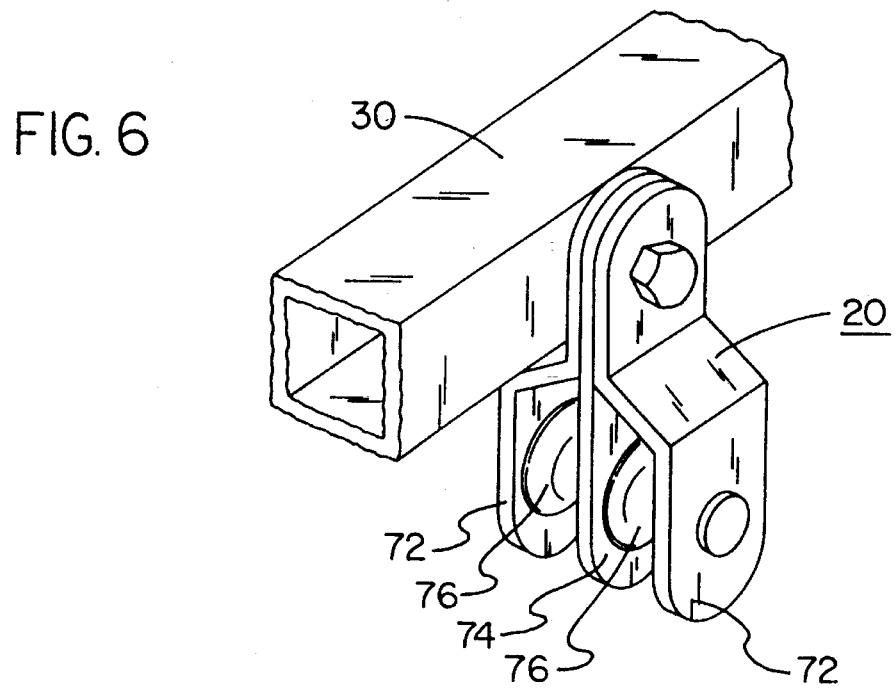
FIG. 6 is an exploded cross sectional view of the upper pulley of the apparatus illustrating its attachment to the horizontal portion of the frame.

An upper pulley 20 is formed of three generally semicircular shaped elements 72, 74. The central element has a longer length than the other two elements and includes an aperture to permit affixation to the center point of the horizontal segment of the frame. The upper pulley has rotatable axles 76 positioned between the first and second elements, and second and third elements. The upper pulley is adapted to support the cable threaded around both axles for the purpose of affecting a three to one lifting ratio. The three to one lifting ratio is caused by the cable being positioned around both axles of the upper pulley and the single axle of the lower pulley therebetween. Note FIGS. 3 and 6.

A side pulley 22 is affixed to the approximate center point of the upper region of the second vertical segment of the frame. The side pulley is formed of two generally semicircular shaped elements with a rotatable axle positioned therebetween. The side pulley prevents tangling of the cable when operating the apparatus. Note FIG. 2.

Figure 5:
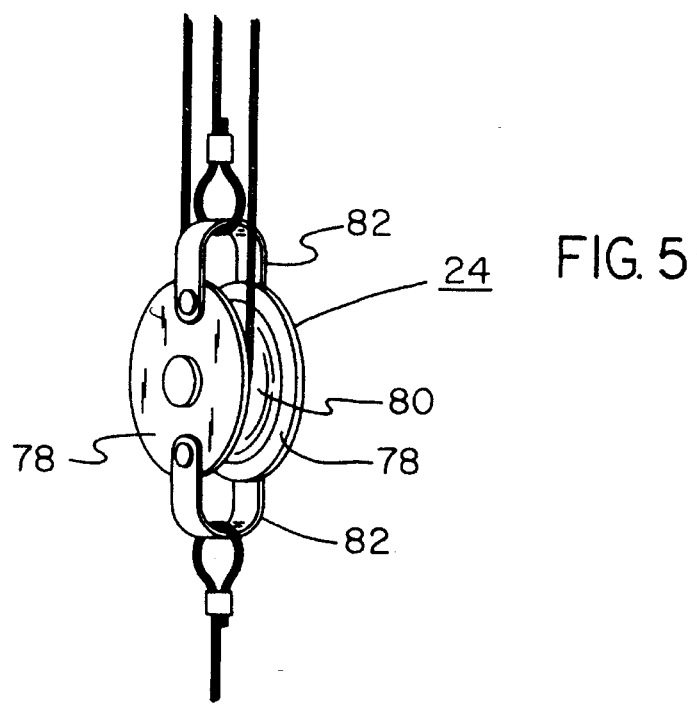
FIG. 5 is a perspective view of the lower pulley of the apparatus.

A lower pulley 24 is formed of two generally planar circular shaped elements 78 with a centrally located rotatable axle 80 positioned therebetween. The lower pulley has generally U-shaped members 82 affixed to diametrically opposing sides of each planar circular element. One member is attached to a free end of the cable. The lower pulley is adapted to support the cable threaded around its axle. The lower pulley is positioned at the approximate center point of the apparatus. Note FIGS. 2 and 5.

A hook system 26 is formed of a length of cable with two free ends 84. The middle portion of the cable is formed into a circular configuration with a clip 86 closing off the circle. The circle is affixed around the lower U-shaped member of the lower pulley. This configuration provides the hook system with a great deal of strength and durability. Note FIGS. 2 and 3.

The two free ends of the cable are affixed through a generally cylindrical shaped pipe 90. Below the pipe is a ring 92 affixed to each free end of the cable. Each ring is affixed to a towing hook 94 to permit coupling with a hand truck or other lifting device. The system includes two straps 96 adapted to be positioned around an object to be lifted when in the operative orientation. The configuration of the hook system permits lifting of a wide variety of different objects. Note FIGS. 1 and 2.

The rear bumper mounted van and truck winch is a device adapted to be temporarily mounted to the back of a truck or van to aid in lifting and transporting heavy items such as appliances, safes, hot water heaters, etc. The apparatus saves time and space, and is safe to use. The invention will save time and space in that there is no need to make room inside the vehicle. Safety is enhanced since there is no need to physically lift items into the vehicle.

The present invention is made of square and angle iron. When bolted together the apparatus forms a support frame which is mounted to the rear bumper of a vehicle by way of brackets and quick disconnect pins. The apparatus is operated with a hand winch. Attached to the hand winch is a cable and a hook system. The hand winch, cable and hook system are operatively coupled to a hand truck or dolly in the operative orientation. Items to be lifted are secured within a hand truck and then raised to the operative transport position. The hand truck and raised object are then strapped to the frame of the apparatus. The frame is further supported by a back strap which is hooked to the bed of the vehicle. When the apparatus is not in use, the quick disconnect pins are removed and the apparatus is ready for storage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved rear bumper mounted van and truck winch comprising, in combination:

a frame formed of three generally rectangular shaped blocks and configured in a rectangular orientation, the frame having a first and second long vertical segment and one short horizontal segment, the segments having a front face, a rear face, an upper region, a lower region and a central region therebetween, the upper, lower and central regions of the vertical segments including apertures extending therethrough, the lower region also including holes extending through its side faces, the horizontal segment including apertures extending therethrough near each end, the horizontal segment being affixed to the front face of the vertical segments with nuts and bolts through the apertures, a strap being coupled to the horizontal segment and the rear of the vehicle to enhance the strength of the frame, the lowermost extent of each vertical segment including an affixed bracket to permit coupling to the rear bumper of a truck or van in an operative orientation, the brackets including releasably coupled disconnect pins to permit a user to quickly and easily remove the apparatus from the rear bumper of the vehicle when not in use;

a winch base having upper and lower long horizontal components and a short vertical component connecting the two horizontal components therebetween, all of the components having apertures extending through their respective ends, the upper horizontal components having a first end and a second end and also including three apertures extending through its midpoint and second end, the lower horizontal components having a first end and a second end and also including an aperture between its midpoint and second end, the horizontal components having their first ends affixed to the rear face of the uppermost and lowermost extents of the central region of a first vertical segment of the frame with nuts and bolts, the horizontal components of the base extending beyond a second vertical segment of the frame with the horizontal components being affixed thereto with nuts and bolts through the apertures, the second end of each horizontal component being affixed to the ends of the vertical component with nuts and bolts through the apertures, two angled side supports forming an inverted V-shaped structure being coupled to the upper horizontal component of the base and the second vertical segment of the frame;

a hand winch and surrounding bracket, the bracket formed in a generally C-shaped configuration with its middle region affixed to the vertical component of the winch base, the bracket having a front portion and a rear portion, a handle shaped in a generally L-shaped configuration being affixed to the front portion and extending horizontally therethrough to the rear portion, the horizontally extending section of the handle being coupled to the hand winch, the hand winch being formed of two generally planar circular members with a centrally positioned axle connecting the two therebetween, the axle of the winch extending beyond the circular members and affixed between the front and rear portions of the bracket, a cable with two free ends having one end coupled to the axle to permit rotational winding of the cable thereupon, in the operative orientation the user turning the handle in a clockwise direction to lift affixed objects;

an upper pulley formed of three generally semi-circular shaped elements, the central element having a longer length than the other two elements and including an aperture to permit affixation to the center point of the horizontal segment of the frame, the upper pulley having rotatable axles positioned between the first and second elements, and second and third elements, the upper pulley adapted to support the cable threaded around both axles for the purpose of affecting a three to one lifting ratio;

a side pulley being affixed to the approximate center point of the upper region of the second vertical segment of the frame, the side pulley formed of two generally semi-circular shaped elements with a rotatable axle positioned therebetween;

a lower pulley formed of two generally planar circular shaped elements with a centrally located rotatable axle positioned therebetween, the lower pulley having generally U-shaped members affixed to diametrically opposing sides of each planar circular element, one member being attached to a free end of the cable, the lower pulley adapted to support the cable threaded around its axle; and a hook system formed of a length of cable with two free ends, the middle portion of the cable being formed into a circle with a clip closing off the circle, the circle being affixed around the lower U-shaped member of the lower pulley, the two free ends of the cable being affixed through a generally cylindrical shaped pipe, below the pipe being a ring affixed to each free end of the cable, each ring being affixed to a towing hook to permit coupling with a hand truck or other lifting device, the system including two straps adapted to be positioned around an object to be lifted when in the operative orientation.

2. A rear bumper mounted van and truck winch comprising:

a frame having two long linear vertical segments and one short linear horizontal segment, the vertical segments being positioned perpendicular to the bumper of a truck or van, the horizontal segments being positioned parallel to the bumper of a truck or van, the segments including a plurality of apertures, the horizontal segment being affixed to the vertical segments, the horizontal segment including a generally cylindrical shaped pulley wheel affixed thereto, the lowermost extent of each vertical segment including a bracket to permit coupling to an approximate center point of the rear bumper of a vehicle, the brackets including releasably coupled disconnect pins having means to permit removal of the apparatus by hand from the rear bumper of a vehicle, a strap being coupled to the horizontal segment and the rear of the vehicle to enhance the strength of the frame; and a winch base having two horizontal components and a vertical component therebetween, each of the components including a plurality of apertures, the horizontal components of the base being affixed to the frame with a portion thereof extending beyond one of the vertical segments, a hand winch formed in a generally cylindrical configuration with a handle projecting therefrom, the hand winch being affixed to the base adjacent to the frame, the hand winch including cable positioned therearound and through the pulley wheel on the frame, the lowermost extent of the cable including a coupling device affixed thereto to permit lifting of heavy objects.

3. The apparatus as set forth in claim 2 and further including a lower pulley wheel formed of two generally planar circular shaped elements with a centrally located rotatable axle positioned therebetween, the lower pulley having generally U-shaped members affixed to diametrically opposing sides of each planar circular element, one member being attached to a free end of the cable, the lower pulley adapted to support the cable threaded around its axle, the lower pulley including means to effect a lifting ratio greater than 1 to 1; and a hook system formed of a length of cable with two free ends, the middle portion of the cable being affixed around the lower U-shaped member of the lower pulley, a cylindrical bar including hooks rotatably coupled thereto in a suspended orientation to permit coupling with a hand truck or other lifting device in the operative orientation.

4. The apparatus as set forth in claim 3 wherein the generally cylindrical shaped pulley wheel affixed to the horizontal segment of the frame includes two separate rotatable axles, each axle having cable wrapped therearound to effect a three to one lifting ratio.

5. The apparatus as set forth in claim 3 wherein the generally cylindrical shaped pulley wheel affixed to the horizontal segment of the frame includes a plurality of separate rotatable axles, each axle having cable wrapped therearound to effect a plurality of different lifting ratios.

* * * * *